United States Patent
Lin et al.

(10) Patent No.: US 10,365,483 B2
(45) Date of Patent: Jul. 30, 2019

(54) ADJUSTING A HEAD-UP DISPLAY (HUD) BASED ON POLARIZATION

(71) Applicant: VISTEON GLOBAL TECHNOLOGIES, INC., Van Buren Township, MI (US)

(72) Inventors: Chao-Hung Lin, Van Buren Township, MI (US); Paul Fredrick Luther Weindorf, Van Buren Township, MI (US); Sebastien Hervy, Van Buren Township, MI (US); Jay P. Dark, Van Buren Township, MI (US); Darrin W. Bruce, Van Buren Township, MI (US); Ryo Kajiura, Van Buren Township, MI (US); Claire Gerardin, Van Buren Township, MI (US)

(73) Assignee: Visteon Global Technologies, INC., Van Buren Township, MI (US)

( * ) Notice: Subject to any disclaimer, the term of this patent is extended or adjusted under 35 U.S.C. 154(b) by 0 days.

(21) Appl. No.: 15/602,997

(22) Filed: May 23, 2017

(65) Prior Publication Data
US 2018/0341109 A1    Nov. 29, 2018

(51) Int. Cl.
G02B 27/01   (2006.01)
G02B 26/06   (2006.01)
G02F 1/01    (2006.01)
G02F 1/133   (2006.01)
(Continued)

(52) U.S. Cl.
CPC ......... *G02B 27/0101* (2013.01); *G02B 26/06* (2013.01); *G02B 27/01* (2013.01); *G02B 27/0149* (2013.01); *G02F 1/0136* (2013.01); *G02F 1/13306* (2013.01); *G09G 3/02* (2013.01); *G02B 27/286* (2013.01); *G02B 2027/014* (2013.01); *G02B 2027/0118* (2013.01); *G02B 2027/0154* (2013.01);
(Continued)

(58) Field of Classification Search
CPC ................ G02B 27/0101; G02B 26/06; G02B 2027/014; G02F 1/0136; G02F 1/13306; G09G 3/02; G09G 2330/02
See application file for complete search history.

(56) References Cited

U.S. PATENT DOCUMENTS

2016/0178901 A1\* 6/2016 Ishikawa ............... B60K 35/00
                                                                  345/7
2016/0349507 A1   12/2016 Hayashi
2017/0227791 A1\* 8/2017 von und zu Liechtenstein ..........
                                                                  G02F 1/01

FOREIGN PATENT DOCUMENTS

CN       203909400 U    10/2014
DE     102015007485 A1   2/2016
JP        2010113197 A   5/2010
(Continued)

OTHER PUBLICATIONS

European Search Report for European application EP18173699.

*Primary Examiner* — Peter D McLoone
(74) *Attorney, Agent, or Firm* — Quinn IP Law

(57) ABSTRACT

Disclosed herein are systems, methods, and devices for implementing a heads-up display (HUD) that is viewable in conditions where a viewer is wearing a p-polarized eyewear, eyewear polarized between s-polarized and p-polarized, or not. Thus, employing the aspects disclosed herein, a viewer may realize all the benefits of a HUD implementation (for example, one implemented via a vehicle), while realizing all the benefits of wearing polarized eyewear.

20 Claims, 10 Drawing Sheets

(51) Int. Cl.
*G09G 3/02* (2006.01)
*G02B 27/28* (2006.01)
(52) U.S. Cl.
CPC ........... *G02B 2027/0156* (2013.01); *G02B 2027/0181* (2013.01); *G09G 2330/02* (2013.01)

(56) References Cited

FOREIGN PATENT DOCUMENTS

| | | |
|---|---|---|
| JP | 2012103331 A | 5/2012 |
| JP | 2016130066 A | 7/2016 |
| JP | 2016047009 A1 | 7/2017 |

\* cited by examiner

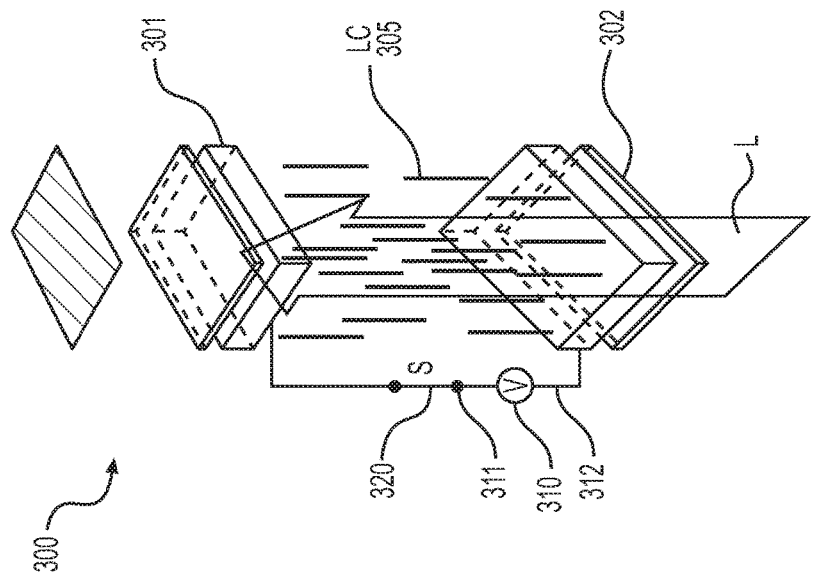
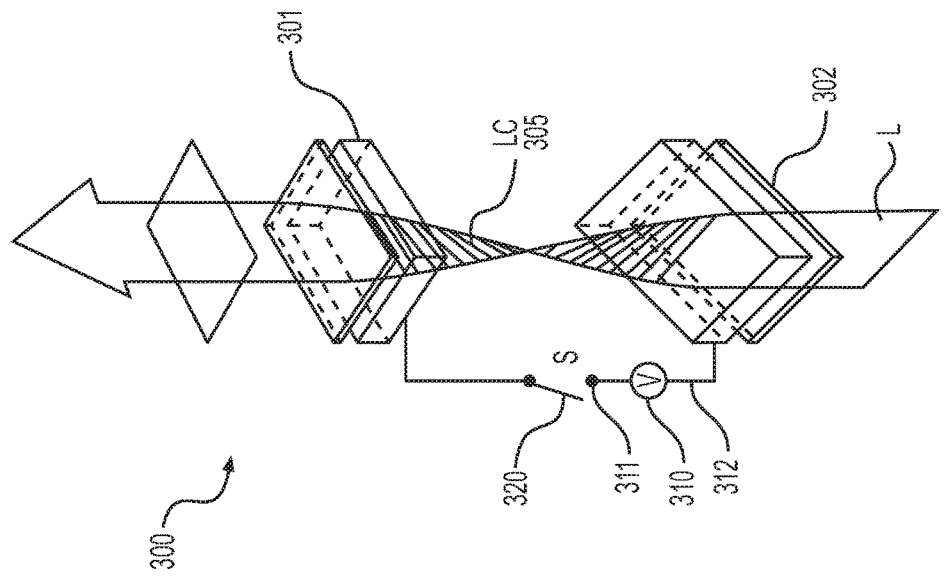

ADJUSTING A HEAD-UP DISPLAY (HUD) BASED ON POLARIZATION

BACKGROUND

Electronic displays are provided in many contexts to electronically render digital information to a viewer. The electronic displays receive information, and render the information through lighted cells in patterns that reflect the texts and pictures employed to convey the information.

A heads-up display (HUD) allows a viewer to view not only the lighted information, but due to the transparent nature of the HUD, the view through the HUD. Thus, a viewer may be delivered information while not losing the ability to view the real world through the HUD.

As shown in FIG. 1, a HUD 100 may include at least a projection unit 110 (or picture generating source), a combiner 120, and a video generation computer 130. Although shown as separate components, all the elements together compose a singular HUD implementation.

The projection unit 110 in a HUD 100 has a convex lens or concave mirror with a light emitting technology (for example, a Cathode Ray Tube (CRT), light emitting diode, or liquid crystal display at its focus). This setup produces an image where the light is collimated, i.e. the focal point is perceived to be in front of the windscreen at a predetermined distance.

The combiner 120 is typically an angled flat or curved piece of glass (a beam splitter) located directly in front of the viewer, that redirects the projected image from a projection unit 110 in such a way as to see the field of view and the projected image at the same time. Combiners 120 may have special coatings that reflect the light projected onto it from the projector unit 110 while allowing all other wavelengths of light to pass through. In some optical layouts, combiners may also have a curved surface to refocus the image from the projecting unit 110.

The computer 130 provides the interface between the HUD 100 and the systems/data to be displayed and generates the imagery to be displayed by the projection unit 110.

In certain HUD applications, the illumination may be provided with additional properties to improve the image. One such technique employed in HUD applications is the use of s-polarization (i.e. an s-polarized optical wave). S-polarization adds optical power to the content being displayed because of a higher reflectivity associated with the s-polarization.

The main reason to employ s-polarization in a HUD implementation is that in some designs there is no coating on the combiner or polarization dependent structure in the media such as grating. Thus, the reflectivity of s-polarization is always greater than the reflectivity of p-polarization.

However, many viewers employ eyewear or other viewing devices that use p-polarization (for example, sunglasses). These devices are employed to avoid deleterious effects caused by environmental conditions, such as sun light.

Thus, by employing an s-polarization component with eyewear that employs p-polarization, the viewer of the HUD is left with a degraded or non-visible image. Several techniques may be employed to address this, such as providing a quarter-wave plate. However, this solution requires additional power to maintain the brightness when a viewer is not wearing a polarized eyewear device.

SUMMARY

The following description relates to systems, methods, and applications for adjusting a HUD based on polarization. Exemplary embodiments may also be directed to any of the system, the method, or an application disclosed herein.

Additional features of the invention will be set forth in the description which follows, and in part will be apparent from the description, or may be learned by practice of the invention.

A system for adjusting a heads-up display (HUD) based on polarization is disclosed herein. The system includes a microprocessor connected to a picture generating source, wherein the microprocessor controls the picture generating source to project light onto the HUD, via a combiner; a data store comprising a non-transitory computer readable medium storing a program of instructions for the providing the microprocessor that executes the program of instructions, the instruction including the following steps, receiving a command to change polarization; in response to the command, instigating a change of polarization of an intermediary device.

In another example, the system includes a human-machine interface (HMI) installed in a vehicle, and the HUD being implemented in the vehicle, wherein the command is generated in response to interaction with the HMI.

In another example, the system is provided so that the intermediary device is an electro optical device, and the microprocessor is configured to control a power source connected to the liquid crystal cell, and the command being defined as a power amount correlated to an amount of polarization of the liquid crystal cell.

In another example, the system is provided so that the intermediary device is a half wave plate rotate-able about an optical axis, and the command being defined as a rotation amount of the half wave plate.

In another example, the system is provided so that the intermediary device is a half wave plate rotate-able about an axis perpendicular to an optical axis, and the command being defined as whether to allow s-polarized or p-polarized light from the HUD.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which:

FIGS. 3(a) and (b) illustrate a conceptual diagram for explain a first embodiment of the aspects disclosed herein;

DETAILED DESCRIPTION

Figure 1:
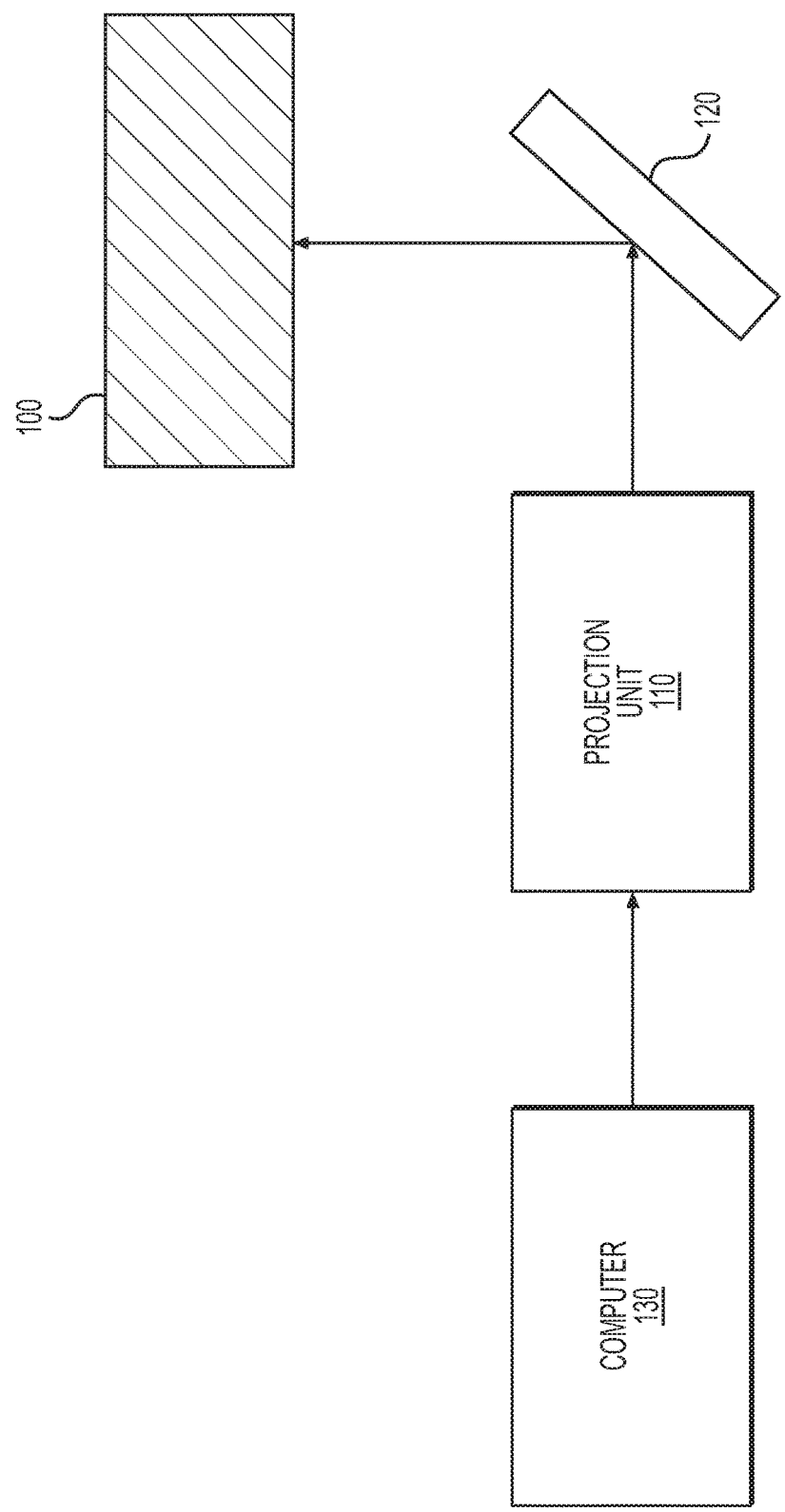
FIG. 1 illustrates a HUD implementation according to the prior art.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

As explained above, the HUD is becoming more commonplace in vehicle-based implementations. The HUD allows a viewer of the HUD to view content on the combiner, while simultaneously viewing the landscape beyond the combiner. Thus, the HUD provides an enhanced implementation of the display experience.

In certain contexts, for example vehicles, the HUD is naturally suited for implementation. Vehicle's often have combiners as part of the windshield (or front window). In other implementations, the combiner may be implemented on any transparent surface provided with a vehicle.

As explained above, if a viewer wears sunglasses (or any eyewear), the content on the HUD may be not viewable. This is due to either natural phenomena causing the content on the HUD to be polarized with a s-polarization, or through a conscious choice by the implementer to employ a specific polarization. Thus, if the eyewear is of a different polarization (for example p-polarization or some polarization between p and s), the content on the HUD becomes unviewable.

Disclosed herein are methods, systems, and HUD implementations that allow a HUD to be viewable via multiple polarization states. By employing the concepts disclosed herein, the implementer of these systems may achieve a HUD that is more advantageous in that it allows viewers wearing different eyewear to view the content. Further, valuable information may thus be provided on the HUD, thereby allowing a more efficient manner of employing available space to convey information to a viewer.

Figure 2:
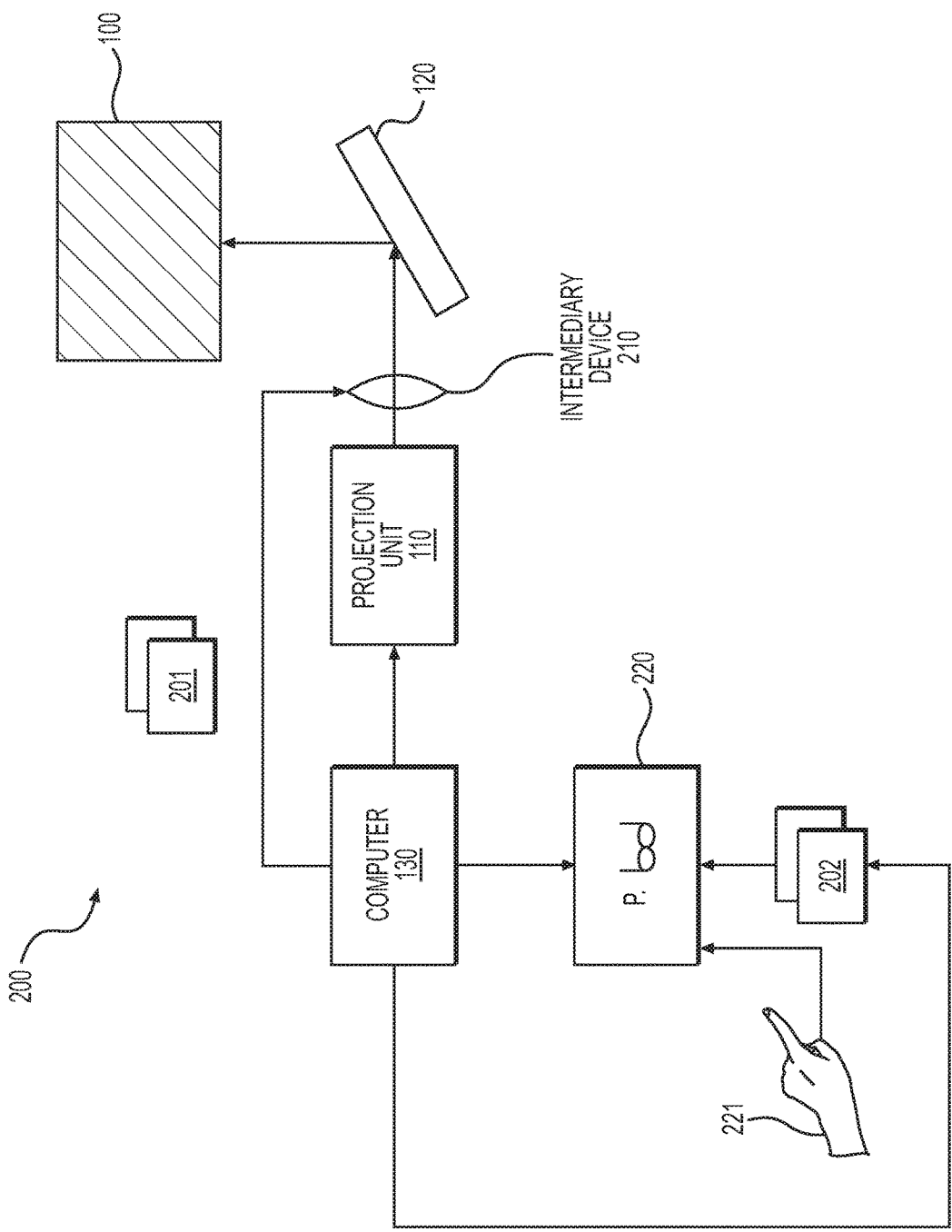
FIG. 2 illustrates a system-level implementation for adjusting a HUD based on polarization.

FIG. 2 illustrates an implementation of a system 200 for adjusting a HUD implementation based on a polarity. As shown, the HUD described in FIG. 1 is replicated. As such, because this HUD is known, explanation of the similar components will be omitted.

In FIG. 2, an intermediary device 210 is provided. Various examples of implementations of the intermediary device 210 are described in FIGS. 6-8. The intermediary device 210 is configured to translate the image projected from the projection unit 110 into a desired polarization.

The intermediary device 210 is shown provided along a path between the projection unit 110 and the combiner 120. However, the placement of the intermediary device 210 may be optionally placed at other portions of the system 200 and along the path of the light being projected onto the HUD 100.

The computer 130 (which may be any sort of microprocessor, or specifically, a vehicle-based microprocessor) is coupled to the projection unit 110. Additionally, the computer 130 is coupled to the intermediary device 210. The computer 130 may instigate an electrical-based control of the intermediary device 210 (shown in FIG. 6) or a mechanical-based control of the intermediary device 210 (shown in FIGS. 7 and 8). The computer 130 employs a data signal 201 propagated to the intermediary device 210, the data signal 201 containing information about the orientation of the intermediary device 210 requested.

Also shown coupled to the computer 130 is an instigating unit 220 (or button 220). The instigating unit 220 may be a physical button employed in a context that is pressable/assertable 221. Alternatively, the instigating unit 220 may be an electronic circuit that is coupled to the computer 130. The computer 130 may automatically generate a data signal 202 that detects the polarity of the viewer of the HUD 100, and causes the instigating unit 220 to instruct the computer to generate a data signal 201 based on the detected polarity.

FIGS. 3(a) and (b) illustrate an example of employing a liquid crystal cell 300 as an intermediary device 210. The liquid crystal cell 300 employed may be any known liquid crystal cell 300 employable that is transparent, and thus allows light through. The properties of the liquid crystal cell 300 will be explained below.

As shown, the liquid crystal layer 300 includes a first electrode 301, a second electrode 302, and a liquid crystal layer 305. The liquid crystals layer 305 has a collection of liquid crystals in which the orientation is varied based on the voltage applied across the field created from first electrode 301 and the second electrode 302.

The voltage (or power) source 310 may be supplied from control of the switch 320, which is connected to the first electrode 301 through node 311 and the second electrode 302, through node 312.

As shown, in FIG. 3(a), no power is applied to electrode 301, due to switch 320 being open. In FIG. 3(b), the converse is true, with switch 320 being closed.

Thus, as illustrated by both FIGS. 3(a) and (b), based on the state of the switch 320 (either allowing voltage across electrodes 301 and 302, or not allowing voltage), light L is rotated through (or not rotated through) accordingly.

Figure 4:
FIGS. 4 and 5 illustrate example data illustrating the effectiveness of the implementation in FIGS. 3(a) and (b)
Figure 5:
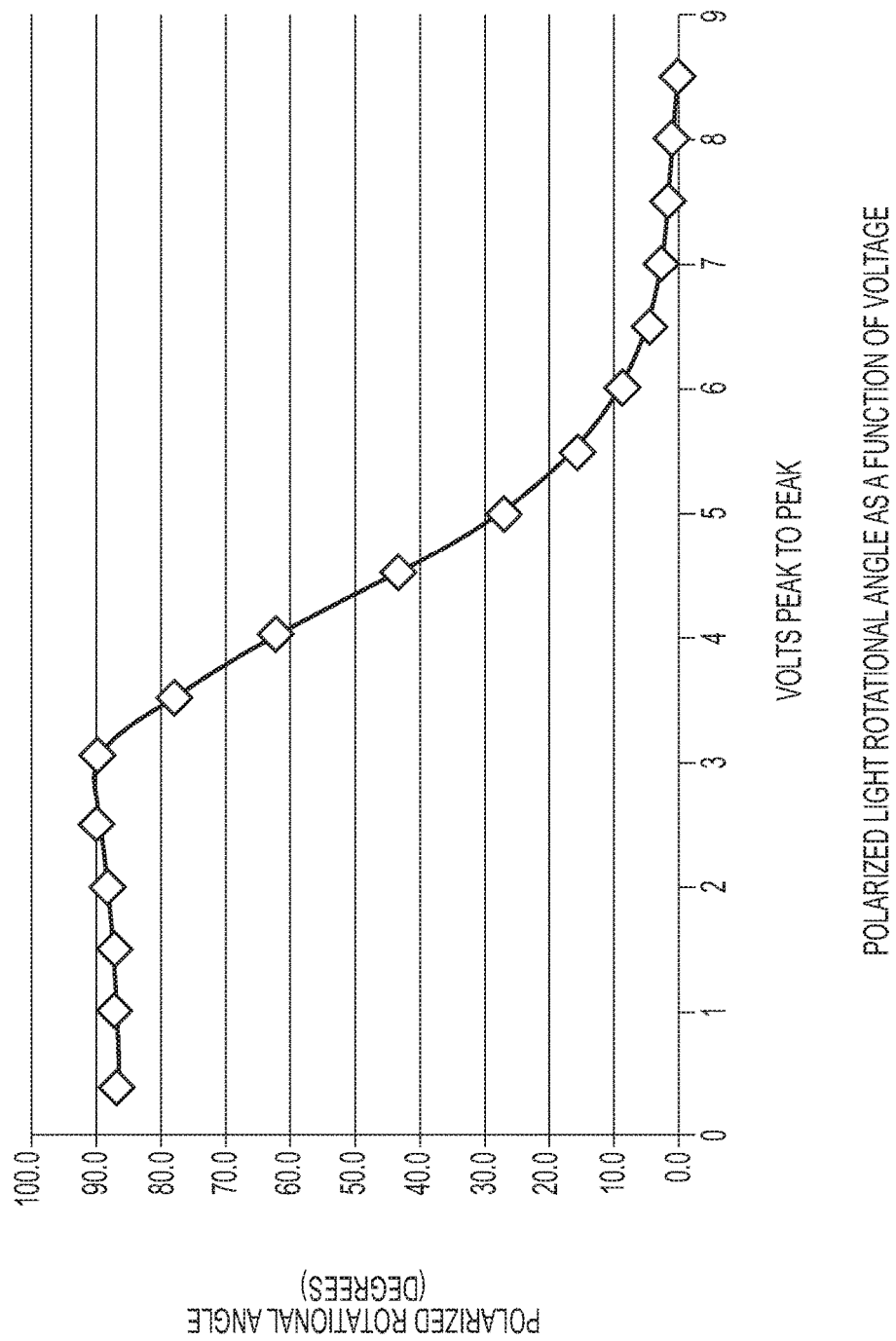

FIGS. 4 and 5 illustrate this phenomenon through an experimental implementation using a polarization layer. As shown in FIG. 4, a table is provided with the following the fields, voltage across the electrodes 401, the transmission % 402 of the light L through the liquid crystal cell 300, and the angle 403 of the liquid crystals 305. As shown in the table, and graphed in FIG. 5, the strength of transmission is related to the voltage applied. Thus, light of a specific polarization (either p or s) may be selectively controlled to pass through based on a voltage applied across a liquid crystal cell 300.

Figure 6:
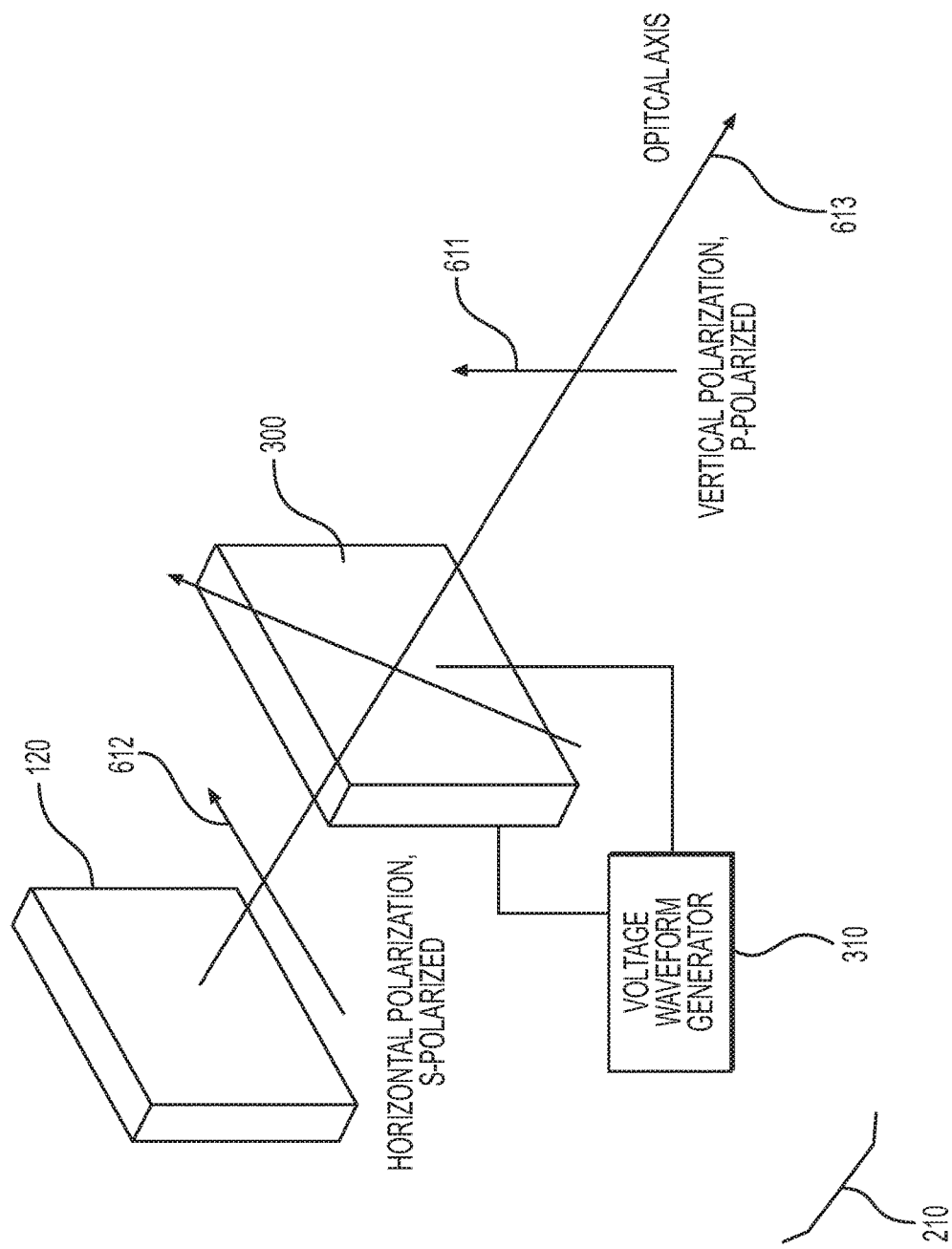
FIG. 6 illustrates an implementation of the first embodiment of the system shown in FIG. 2.

FIG. 6 illustrates an implementation of the aspects describe in FIGS. 3(a) and (b). As shown, the light generated from combiner 120 may be of a specific polarization. An electro-optical device, such as liquid crystal cell 300, is provided and electrically coupled to a voltage waveform generator 310 (or power source). Thus, employing the values shown in FIGS. 4 and 5, and the concepts described herein, the light propagated through the liquid crystal cell 300 may be either s-polarized (horizontal) 612 or p-polarized (vertical) 611 via the optical axis 613.

In some implementations, the amount of voltage may be varied so that the amount of polarization is neither s nor p, and a value in between.

Figure 7:
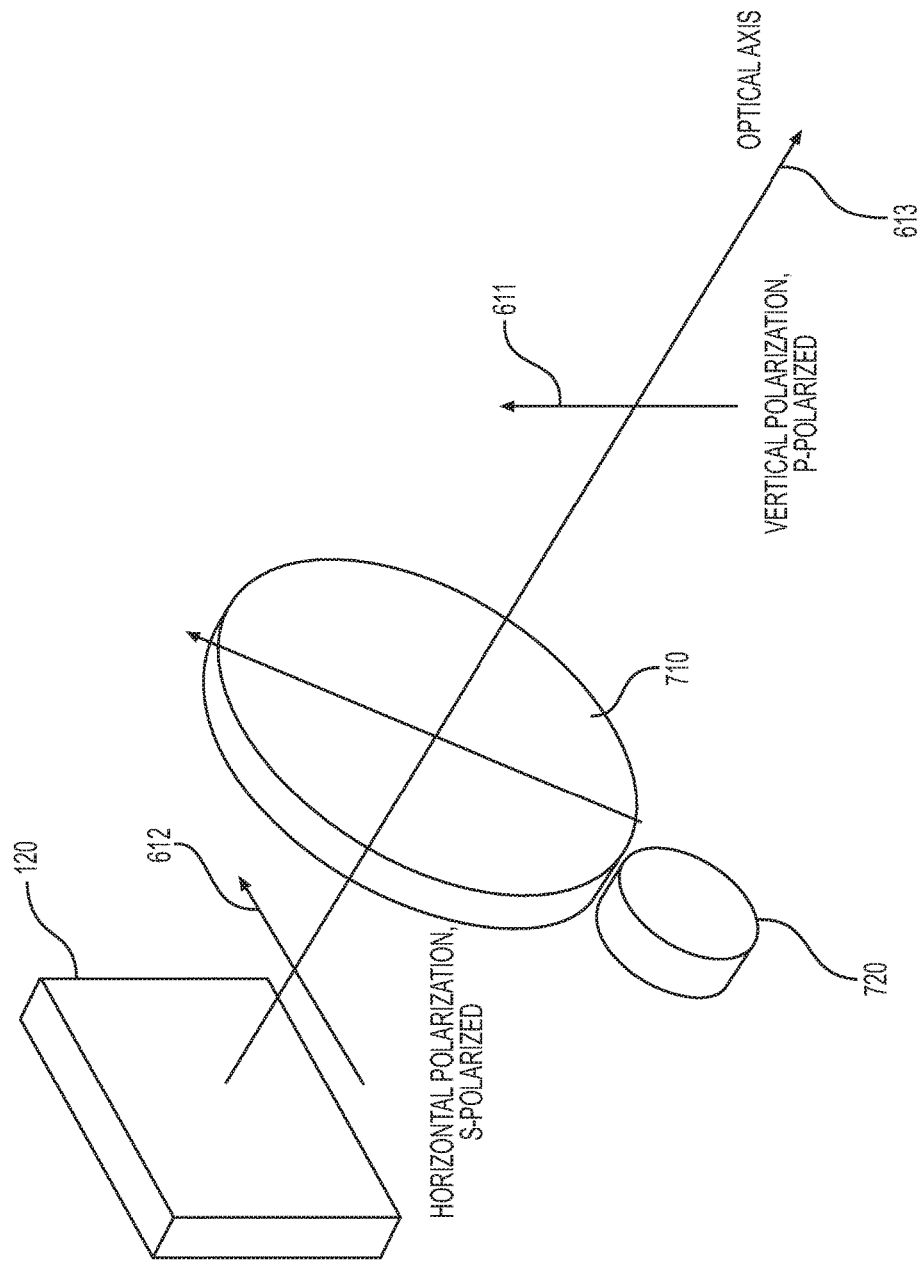
FIG. 7 illustrates an implementation of a second embodiment of the system shown in FIG. 2.

FIG. 7 illustrates a second embodiment of the aspects disclosed herein. Instead of a liquid crystal cell 300 being implemented, a circular half-wave plate 710 is implemented with a kinematics rotating mechanism 720. The kinematics rotating mechanism 720 may be any sort of mechanical device configured to rotate the circular half-wave plate 710 via the optical axis 613. Accordingly, the value of polarized light propagated from the combiner 120 may be either s-polarized 612, p-polarized 611, or a value in between.

Figure 8:
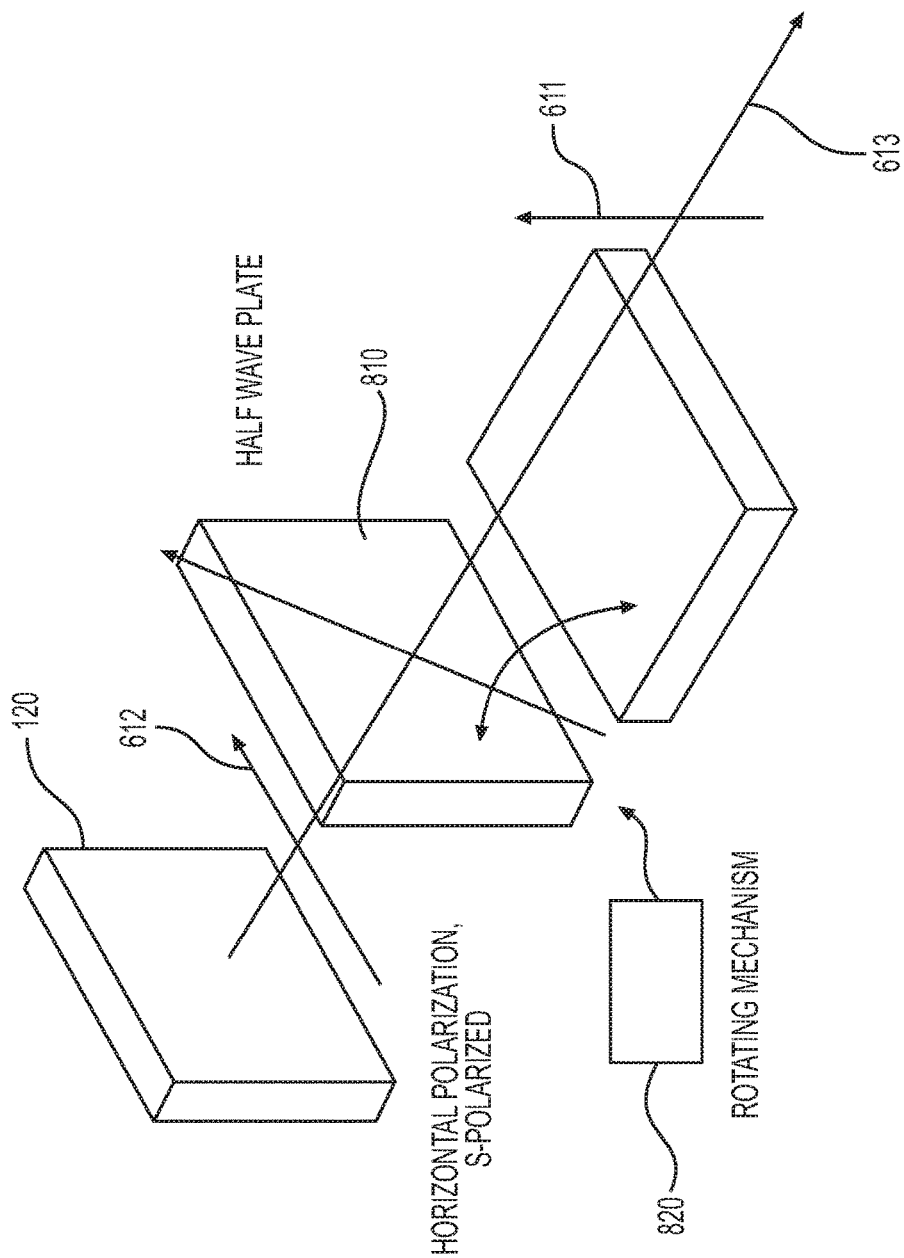
FIG. 8 illustrates an implementation of a third embodiment of the system shown in FIG. 2.

FIG. 8 illustrates a third embodiment of the aspects disclosed herein. As shown, a rotating mechanism 820 is provided with a half wave plate 810. In the example shown in FIG. 8, the rotating mechanism 820 rotates the half wave plate 810 on an axis perpendicular to the optical axis 613. Thus, the light being propagated from the combiner 120 is assumed to be s-polarized. In a first state, when the half wave plate 810 is between the combiner 120 and the HUD 100, the half wave plate 810 allows the s-polarized light to be viewable by the p-polarized wearing viewer. If the half wave plate 810 is rotated in a fashion where it is no longer in the pathway of light being propagated, s-polarized light is propagated to the HUD 100. As such, a viewer wearing p-polarized glasses would be unable to view the HUD 100.

In the example mentioned above, the half wave plate 810 is rotated away. However, in other examples, a sliding action may be performed to slide the half wave plate 810 in a direction perpendicular to the optical axis 613.

Figure 9A:
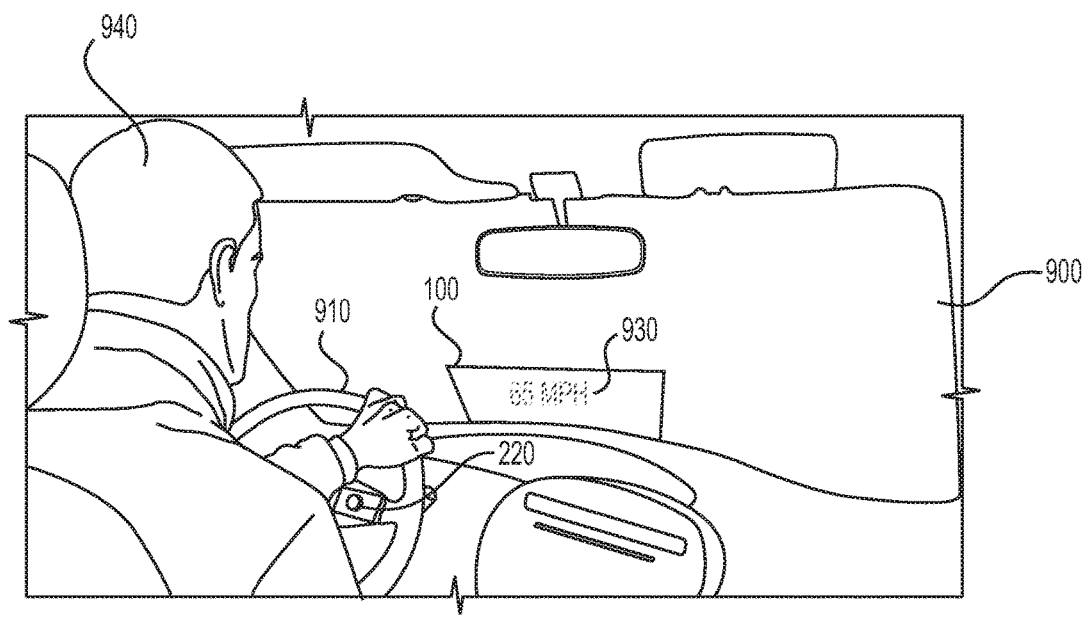
FIGS. 9(a)-(c) illustrate an example of employing the aspects disclosed herein in a vehicular context.
Figure 9B:
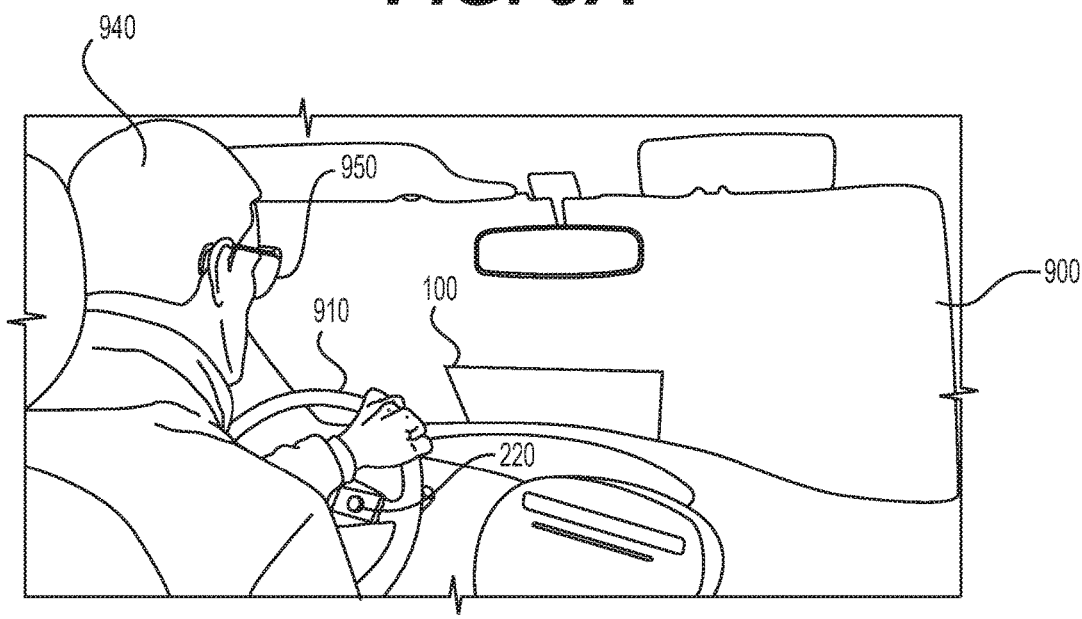
Figure 9C:
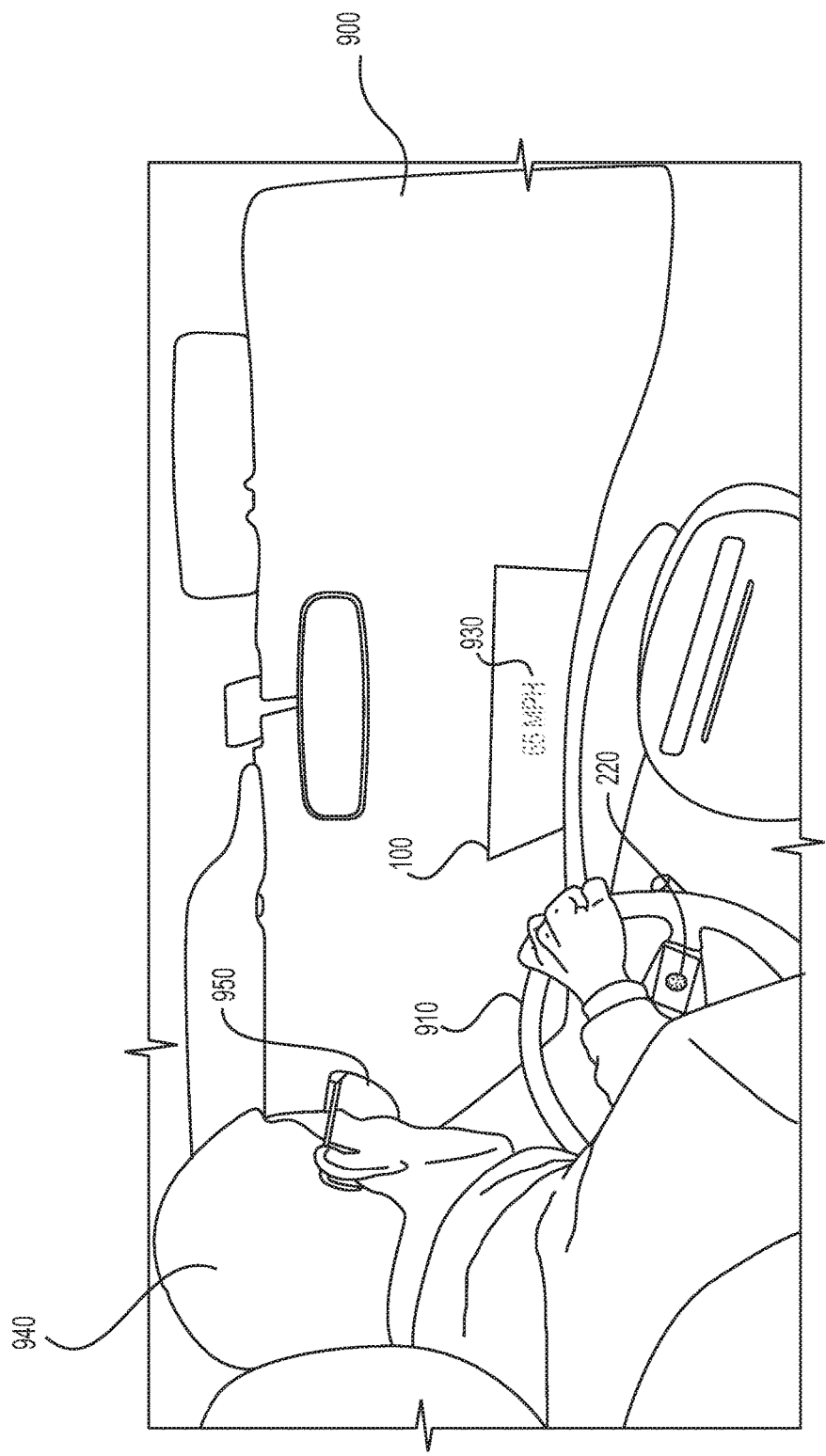

This phenomenon is explained with respect to FIGS. 9(*a*)-(*c*), which explains an example implementation of the various embodiments described herein.

As shown, a button 220 is disposed on a steering wheel 910. This placement is exemplary, with numerous human-machine interface (HMI) implementations being employable. As shown in FIGS. 9(*a*)-(*c*), a front windshield 900 of a vehicle is displayed. Also include is a HUD 100 implemented on the windshield 900. In an implementation such as this, the windshield 900 may serve as the combiner 120. The various other elements of the HUD are not shown (the computer 130 and the projection unit 110).

In FIG. 9(*a*), a viewer 940 is able to see content 930 on the HUD 100. In FIG. 9(*b*), the viewer 940 wears eyewear 950. Because the eyewear is presumably p-polarized, the content being display via the HUD 100 is not visible (or may be lightly visible).

At this juncture, and as shown in FIG. 9(*c*), button 220 is asserted through any known HMI techniques. Or as explained above in FIG. 2, the detection of the viewer's eyewear may automatically be performed, and as such, the systems described above (for example, in FIGS. 6-8) are instigated. Thus, the content 930 becomes visible again.

Thus, employing aspects disclosed herein, a viewer of a HUD, such as the combiner implementations described above in a vehicle, may realize an improved experience when wearing polarized eyewear. By employing the aspects disclosed herein, the viewer of the HUD may optimally avoid deleterious effects of outside conditions, such as solar rays, while still being able to view content on the HUD.

The various aspects above discuss instances in which the origination light signal is s-polarized. However, due to the chromatic properties of installation components, a p-polarized light may be generated from the projection unit 110. The aspects disclosed herein may be applied in reverse to these situations.

Certain of the devices shown include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for adjusting a heads-up display (HUD) based on polarization, comprising:
   a microprocessor connected to a picture generating source, wherein the microprocessor controls the picture generating source to project light onto the HUD via a combiner;
   a data store comprising a non-transitory computer readable medium storing a program of instructions;
   wherein the microprocessor is configured to execute the program of instructions to perform a process, the process comprising:
   receiving a command to change polarization;
   in response to the command, instigating a change of polarization of the light projected onto the HUD using a change of polarization of an intermediary device, wherein the change of polarization is configured to align the polarization of the projected light with a polarization of eyewear of a viewer of the HUD.

2. The system according to claim 1, further comprising a human-machine interface (HMI) installed in a vehicle, and the HUD being implemented in the vehicle, wherein the command is generated in response to interaction with the HMI.

3. The system according to claim 1, wherein the intermediary device is an electro optical device, and the microprocessor is configured to control a power source connected to a liquid crystal cell of the electro optical device, and the command comprises a power amount correlated to an amount of polarization of the liquid crystal cell of the electro optical device.

4. The system according to claim 1, wherein the intermediary device is a half-wave plate rotate-able about an optical axis, and the command comprises a rotation amount of the half-wave plate about the optical axis.

5. The system according to claim 4, wherein the intermediary device further comprises a kinematics rotating mechanism configured to rotate the circular half-wave plate via the optical axis in response to the command to change polarization.

6. The system according to claim 1, wherein the intermediary device is a half-wave plate rotate-able about an axis perpendicular to an optical axis, and the command comprises polarization selection instructions as to whether to allow s-polarized or p-polarized light from the HUD.

7. The system according to claim 1, wherein the command to change polarization is generated based on detecting a polarization of eyewear of a viewer of the HUD.

8. The system according to claim 7, wherein the detecting is based on a data signal generated by the microprocessor.

9. A system for adjusting heads-up display (HUD) based on polarization, comprising:
   a microprocessor connected to a picture generating source, wherein the microprocessor controls the picture generating source to project light onto the HUD via a combiner;
   a data store comprising a non-transitory computer readable medium storing a program of instructions;
   wherein the microprocessor is configured to execute the program of instructions to perform a process, the process comprising:
   receiving a command to change polarization;
   in response to the command, instigating a change of polarization of the light projected onto the HUD via a change of polarization of an intermediary device, wherein the intermediary device is an electro optical device, and the microprocessor is configured to control a power source connected to a liquid crystal cell of the electro optical device, and the command comprises a power amount of polarization of the liquid crystal cell of the electro optical device,
   wherein the change of polarization is configured to align the polarization of the projected light with a polarization of eyewear of a viewer of the HUD.

10. The system according to claim 9, wherein the command to change polarization is generated based on detecting a polarization of eyewear of a viewer of the HUD.

11. The system according to claim 10, wherein the detecting is based on a data signal generated by the microprocessor.

12. The system according to claim 9, further comprising a human-machine interface (HMI) installed in a vehicle, and the HUD being implemented in the vehicle, wherein the command is generated in response to interaction with the HMI.

13. A system for adjusting a heads-up display (HUD) based on polarization, comprising:
   a microprocessor connected to a picture generating source, wherein the microprocessor controls the picture generating source to project light onto the HUD via a combiner;
   a data store comprising a non-transitory computer readable medium storing a program of instructions;

wherein the microprocessor is configured to execute the program of instructions to perform a process, the process comprising:

receiving a command to change polarization;

in response to the command, instigating a change of polarization of the light projected onto the HUD via a change of polarization of an intermediary device, wherein the intermediary device is a half-wave plate rotate-able about an axis, and the command comprises a rotation amount of the half-wave plate, wherein the change of polarization is configured to align the polarization of the projected light with a polarization of eyewear of a viewer of the HUD.

14. The system according to claim 13, wherein the axis is defined as the optical axis.

15. The system according to claim 14, wherein the half-wave plate is rotate-able about the optical axis, and the command comprises a rotation amount of the half-wave plate about the optical axis.

16. The system according to claim 14, wherein the intermediary device further comprises a kinematics rotating mechanism configured to rotate the circular half-wave plate via the optical axis in response to the command to change polarization.

17. The system according to claim 13, wherein the axis is defined as being perpendicular to an optical axis.

18. The system according to claim 17, wherein the half-wave plate is rotate-able about the axis perpendicular to an optical axis, and the command comprises polarization selection instructions as to whether to allow s-polarized or p-polarized light from the HUD.

19. The system according to claim 13, wherein the command to change polarization is generated based on detecting a polarization of eyewear of a viewer of the HUD.

20. The system according to claim 19, wherein the detecting is based on a data signal generated by the microprocessor.

* * * * *